United States Patent [19]

Owen

[11] Patent Number: 5,615,620
[45] Date of Patent: Apr. 1, 1997

[54] DESK ESPECIALLY ADAPTED FOR USE IN A VEHICLE

[75] Inventor: Noel S. Owen, Rogers, Ark.

[73] Assignee: Assembled Products Corporation, Rogers, Ark.

[21] Appl. No.: 368,865

[22] Filed: Jan. 5, 1995

[51] Int. Cl.⁶ .......................... A47B 23/04; A47B 37/00
[52] U.S. Cl. .............................. 108/45; 108/49; 108/150; 248/458
[58] Field of Search ................................. 108/10, 42, 49, 108/150, 45; 248/441.1, 442.2, 458; 403/377, 378

[56] References Cited

U.S. PATENT DOCUMENTS

| | | |
|---|---|---|
| 230,446 | 7/1880 | Strange . |
| 451,430 | 4/1891 | Held . |
| 794,099 | 7/1905 | Heaney ................................ 248/442.2 |
| 1,098,999 | 6/1914 | Walker ................................ 248/442.2 |
| 1,384,861 | 7/1921 | Schingel . |
| 1,701,696 | 2/1929 | Parsons . |
| 1,841,770 | 1/1932 | Tharp . |
| 2,236,133 | 3/1941 | Croninger et al. . |
| 2,449,492 | 9/1948 | Long . |
| 2,567,593 | 9/1951 | Bemis ................................ 108/150 |
| 2,638,701 | 5/1953 | Dahlgren . |
| 3,285,207 | 11/1966 | Vom Hagen ........................ 108/150 |
| 3,894,709 | 7/1975 | Weir . |
| 3,922,973 | 12/1975 | Sturgeon . |
| 3,985,374 | 10/1976 | Powaska . |
| 4,214,739 | 7/1980 | Dailey . |
| 4,223,860 | 9/1980 | Prest . |
| 4,568,052 | 2/1986 | Solomon et al. . |
| 4,591,124 | 5/1986 | Hellenbrand et al. . |
| 4,682,749 | 7/1987 | Sträter . |
| 4,801,120 | 1/1989 | Gregoire . |
| 4,872,630 | 10/1989 | Cooper . |
| 4,909,159 | 3/1990 | Gonsoulin . |
| 5,037,162 | 8/1991 | Ransom . |
| 5,058,848 | 10/1991 | Ferraro . |
| 5,106,048 | 4/1992 | Lebar et al. . |
| 5,161,766 | 11/1992 | Arima . |
| 5,181,681 | 1/1993 | Edwards . |
| 5,279,488 | 1/1994 | Fleming . |
| 5,293,825 | 3/1994 | Cauffiel ............................ 108/49 |
| 5,297,768 | 3/1994 | Denton . |
| 5,322,021 | 6/1994 | Jackson . |
| 5,449,100 | 9/1995 | Eckhart ............................ 403/378 |
| 5,479,865 | 1/1996 | Cauffiel ............................ 108/42 |

FOREIGN PATENT DOCUMENTS 1068757  12/1979  Canada ................................ 108/150

Primary Examiner—Jose V. Chen
Assistant Examiner—Anthony D. Barfield
Attorney, Agent, or Firm—Boyd D. Cox

[57] ABSTRACT

A portable desk according to a preferred embodiment includes a base plate securable to a vehicle floor board by conventional fasteners such as bolts or screws. A centrally disposed fixed cylindrical pedestal extends upwardly from the base plate into an open bottom end of a tubular vertical support column. A first set screw secures the support column in a rotationally and vertically adjusted position to the pedestal. A mounting standard includes a straight lower leg portion secured in a telescopically adjusted position within an open upper end of the vertical support column by a second set screw. An upper leg of the mounting standard is inclined at a forty-five degree angle relative to the longitudinal axis of the support column. A third set screw adjustably secures an upper end of the inclined upper leg of the mounting standard in telescoping relation within a mounting socket. A toggle clamping screw in conjunction with a pivotal mounting bracket adjustably secures a support platform to an upper end of the mounting socket. A desk surface may be secured to the support platform by conventional fasteners such as screws. The device may be used with the desk surface in a vehicle, or detached from the pedestal and secured to a conventional microphone stand or other support for use as a portable podium at oral presentations. The device may also be used without the desk surface to support and/or secure a variety of articles such as two-way radios, etc.

10 Claims, 3 Drawing Sheets

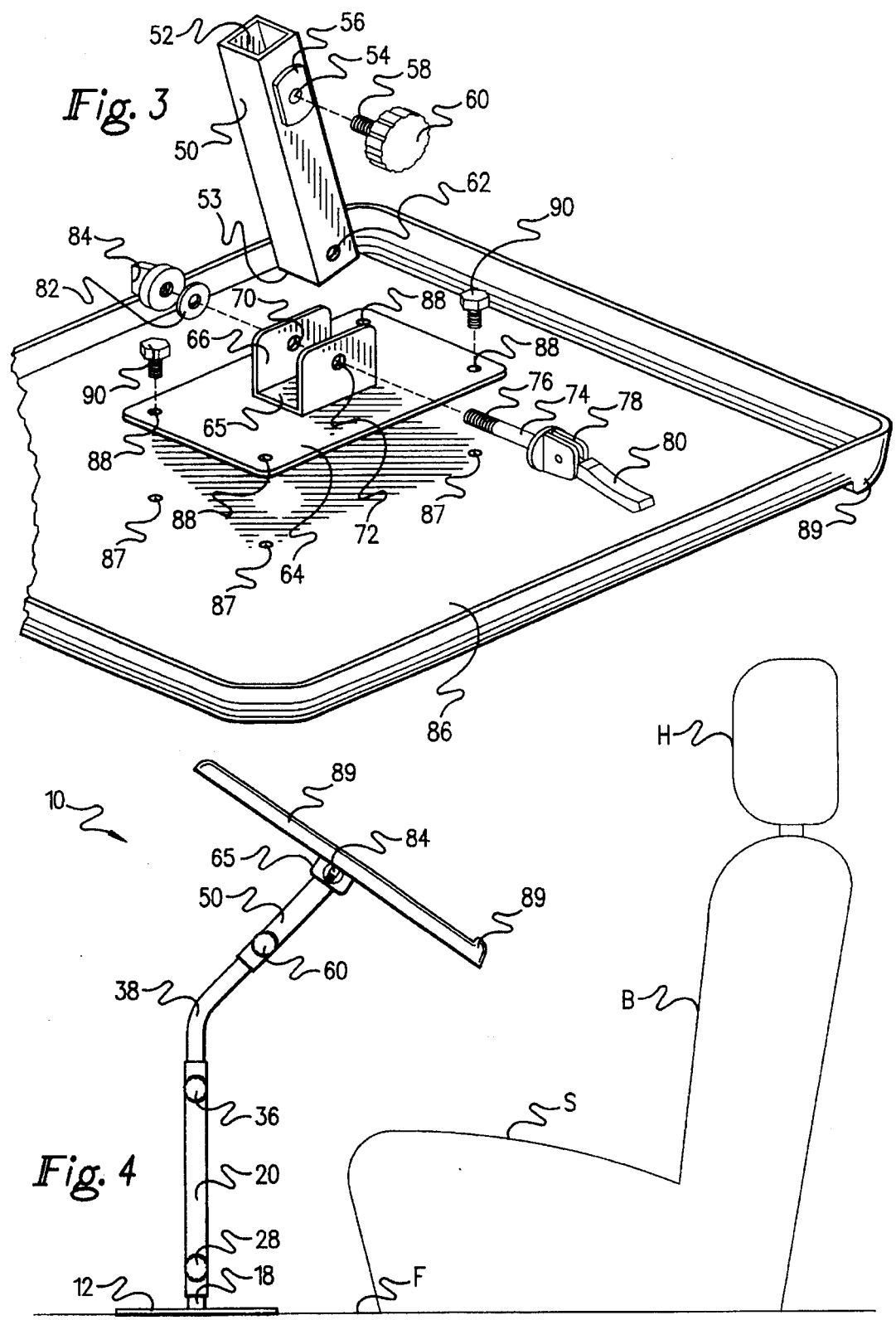

5,615,620

DESK ESPECIALLY ADAPTED FOR USE IN A VEHICLE

BACKGROUND OF THE INVENTION

The present invention relates to desks, and in particular to a portable desk especially adapted for use in a vehicle which is also removeable from the vehicle for use as a portable podium at oral presentations.

SUMMARY OF THE INVENTION

A portable desk according to a preferred embodiment of the invention includes a base plate securable to a vehicle floor board by conventional fasteners such as bolts or screws. A centrally disposed fixed cylindrical pedestal extends upwardly from the base plate into an open bottom end of a tubular vertical support column. A first set screw secures the support column in a rotationally and vertically adjusted position to the pedestal. A mounting standard includes a straight lower leg portion secured in a telescopically adjusted position within an open upper end of the vertical support column by a second set screw. An upper leg of the mounting standard is inclined at a forty-five degree angle relative to the longitudinal axis of the support column. A third set screw adjustably secures an upper end of the inclined upper leg of the mounting standard in telescoping relation within a mounting socket. A toggle clamping screw in conjunction with a pivotal mounting bracket adjustably secures a support platform to an upper end of the mounting socket. A desk surface may be secured to the support platform by conventional fasteners such as screws.

The device may be used with the desk surface in a vehicle, or detached from the pedestal and secured to a conventional microphone stand or other support for use as a portable podium at oral presentations. The device may also be used without the desk surface to support and/or secure a variety of articles such as two-way radios, etc.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 3 is an exploded perspective view illustrating an adjustable toggle cam clamp mounting mechanism for pivotally mounting a desk surface of the device of the present invention in a selected angularly adjusted orientation.

FIG. 4 is a side elevational view illustrating the desk according to the present invention mounted in a vehicle.

DETAILED DESCRIPTION OF THE PREFERRED EMBODIMENT(S)

Figures 1, 2:
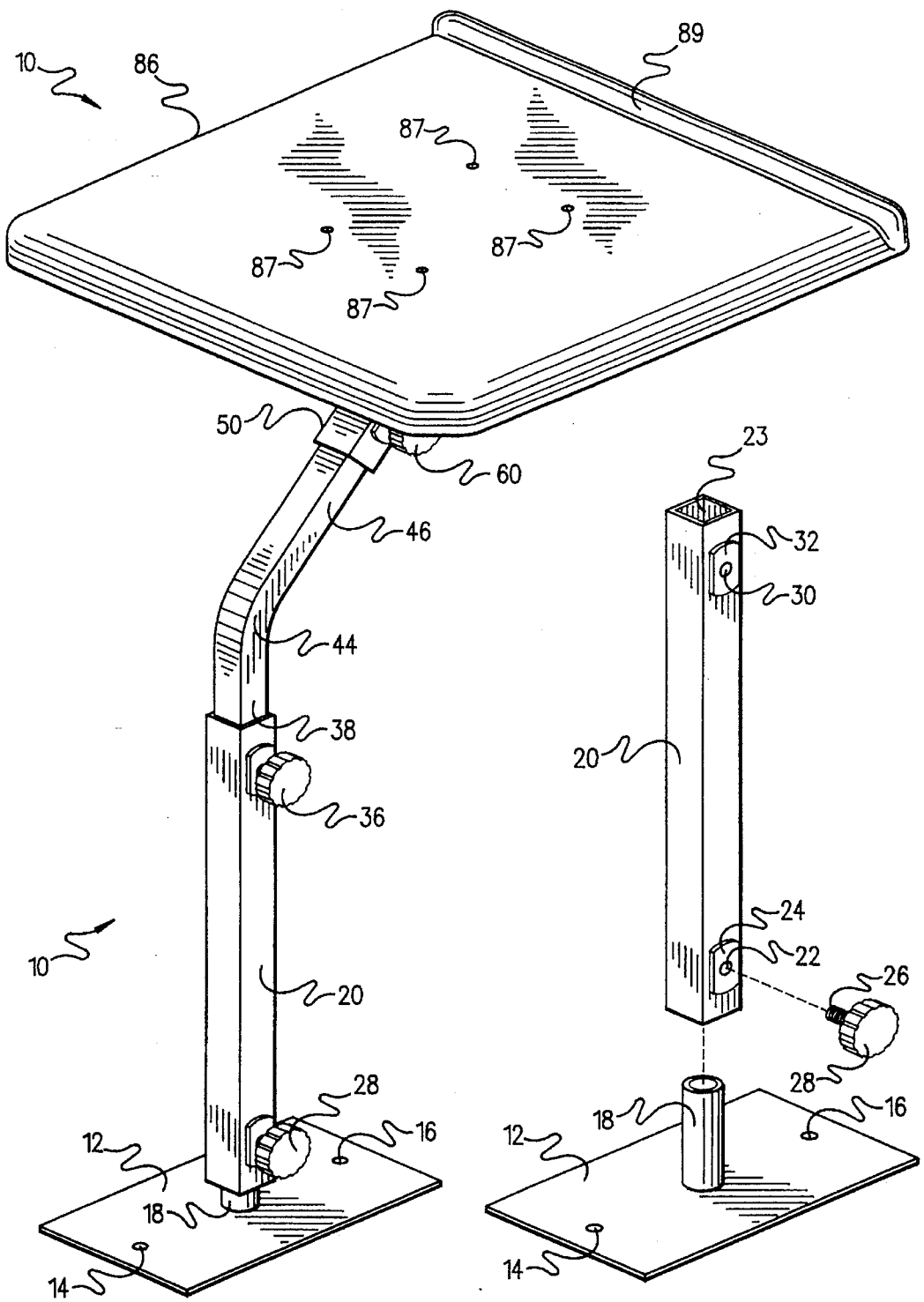
FIG. 1 is a perspective view illustrating a desk according to the present invention.
FIG. 2 is an exploded partial perspective view illustrating base and support column components of the desk according to the present invention.

Referring now to the drawings, wherein like reference numerals designate corresponding structure throughout the views, and referring in particular to FIGS. 1, 2, 4, and 5, a desk or support device 10 pursuant to the present invention includes a base plate 12 having an elongated rectangular configuration and including at opposite ends apertures 14 and 16 adapted for the receipt of conventional threaded fasteners such as screws or bolts for the purpose of securing the base plate 12 in a desired location such as on a floor or a table surface, or particularly to the floor board of a vehicle such as a car or bus. A centrally upstanding hollow cylindrical mounting pedestal 18 fixedly secured to an upper surface of the base plate 12 slip fits with close conformance into an open bottom end 21 of an elongated tubular support column 20 having a square transverse cross sectional shape. A fiat plate shaped nut 24 welded to an outer side surface of the support column 20 includes a centrally disposed threaded aperture 22 dimensioned for threaded engagement with a set screw 26 provided with an enlarged handle knob 28. Accordingly, by manual manipulation of the set screw knob 28, a user may secure the support column 20 in a selected vertically and rotationally adjusted position to the pedestal 18 on the base plate 12.

A tubular mounting standard 38 possesses a square transverse cross sectional shape dimensioned and configured for relatively close conforming slip fit insertion within an open upper end 23 of the support column 20. A fiat plate shaped nut 32 welded to a side surface of the support column 20 adjacent to the upper end 23 includes a central threaded aperture 30 dimensioned for engagement with a set screw 34 secured to an enlarged handle knob 36. Thus, a user may selectively insert a bottom end 42 of the mounting standard 38 into the open upper end 23 of the support column 20, and secure the mounting standard 38 in a selected telescopically adjusted position by tightening the set screw knob 36. The mounting standard 38 includes an intermediate forty-five degree bend portion 44 connecting a lower leg portion 40 to an upper inclined leg portion 46.

The upper leg 46 of the mounting standard 38 includes an upper end 48 dimensioned for closely conforming slip fit insertion within an open bottom end 52 of a desk mounting socket 50. A fiat plate shaped nut 56 welded to a side surface of the socket 50 adjacent the bottom end 52 includes a central threaded aperture 54 dimensioned for engagement with a set screw 58 secured to a handle knob 60. Accordingly, by selective manipulation of the set screw knob 60, a user may readily secure the mounting socket 50 in a selected adjusted position along the upper inclined leg 46 of the mounting standard 38.

Figure 5:
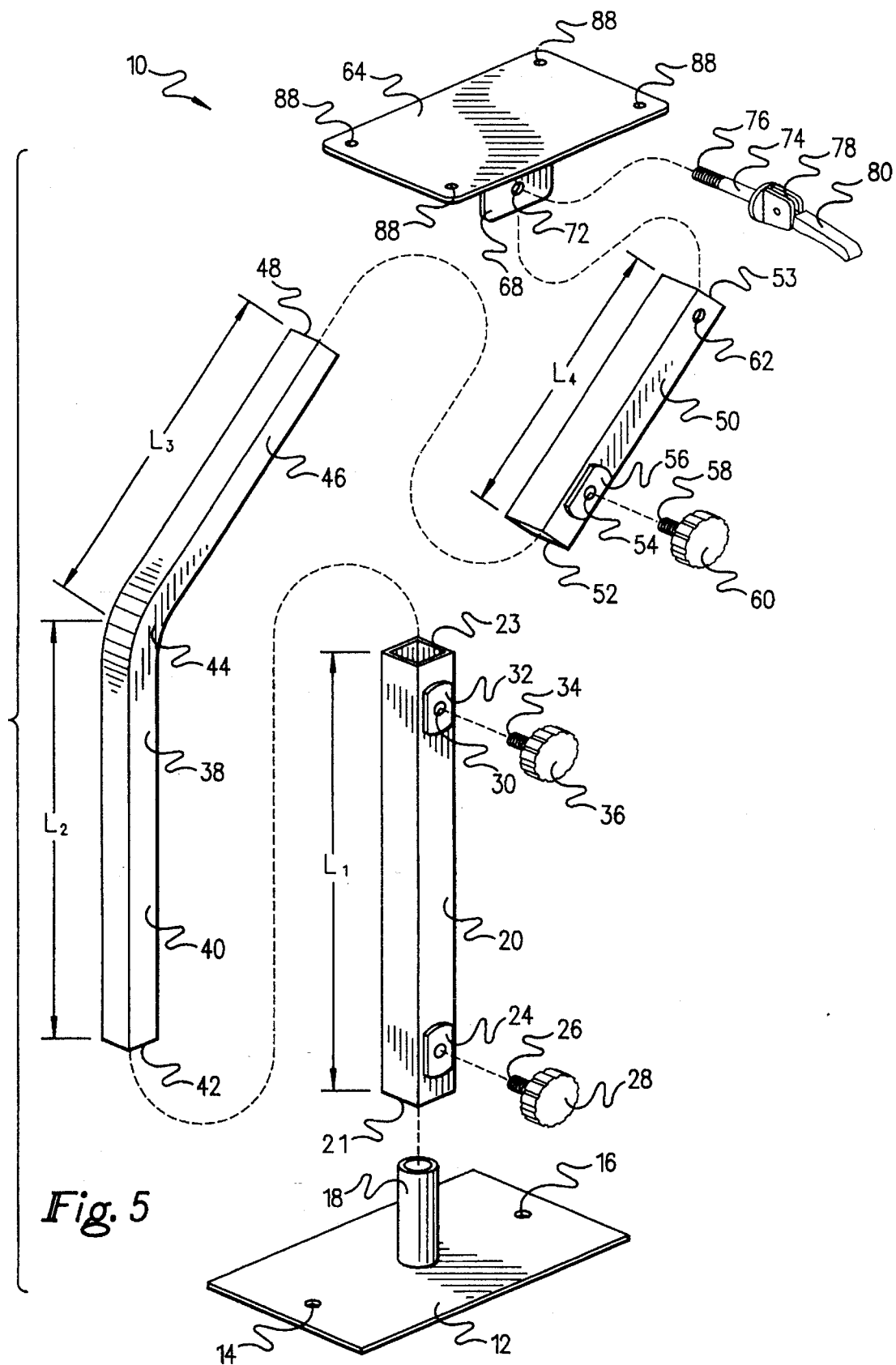
FIG. 5 is an exploded perspective view illustrating components of the desk according to the present invention.

With reference to FIGS. 3 and 5, the desk 10 of the present invention includes a rectangular support platform 64 having a rectangular channel shaped bracket 65 including spaced parallel rectangular legs 66 and 68 connected by an integral transverse leg. The transverse leg of the bracket 65 is preferably centrally secured to the bottom surface of the support platform 64 by welding or by other conventional fastening techniques. The parallel legs 66 and 68 of the bracket 65 are dimensioned to receive the upper end portion 53 of the mounting socket 50 therebetween in relatively closely conforming engagement, but with sufficient clearance to allow pivotal adjustment of the platform 64 relative to the socket 50.

To this end, the bracket legs 66 and 68 include coaxial transverse apertures 70 and 72 dimensioned and disposed for alignment with a bore 62 extending transversely through the socket 50 adjacent the upper end 53 thereof. A smooth cylindrical shank portion 74 of a conventional adjustable toggle cam clamp type screw extends through the aligned apertures 72, 62, and 70 and possesses a threaded end portion 76 which is received through a washer 82 and is disposed in threaded engagement with a nut 84. By moving the toggle clamping lever 80 along the cam surfaces 78 from the open position illustrated in FIGS. 3 and 5 to a transversely oriented closed position, a user may readily clamp the bracket legs 66 and 68 in a selected angularly adjusted position about the axis of the shank 74 relative to the mounting socket 50. While a variety of conventional pivotal fastening members may be employed, a suitable toggle screwclamp is available from the Delta Company located in Stoughton, Mass. under the designation ATB seatpost clamp quik-release, item number TD7400. Upon tightening of the toggle clamp screw by manipulation of the clamp lever 80, the resilient or flexible nature of the bracket legs 66 and 68 allows them to flex slightly together, into clamping engagement with opposite side portions of the mounting socket 50, thus securing the platform 64 in a selected angularly adjusted position.

With reference to FIG. 3, the support platform 64 includes four apertures 88 disposed adjacent corner portions and in coaxial alignment with respective similar apertures 87 formed in an underside of a desk surface 86. The apertures 87 are preferably threaded and do not extend entirely through the desk surface 86 such that the desk surface 86 may be secured to the support platform 64 by use of a plurality of screws 90, without exposing end portions of the screws 90 through the upper surface of the desk 86. Other alternative fasteners such as bolts, rivets, clamps, adhesives, welding, etc., may also be employed. With reference to FIGS. 1 and 4, the desk surface 86 may preferably include a lower projecting lip or stop member 89 to prevent papers, books, and other materials from sliding downwardly off of the desk surface 86, and may also include a spring clip (not shown) of the type used on a conventional clip board.

FIG. 4 illustrates an example preferred use of the portable desk 10 of the present invention, in which the base plate 12 is secured to a floor board F of a vehicle such as an automobile, in a position forwardly of a conventional vehicle seat S of the type including a back B and a head rest H. It should be noted that the desk 10 of the present invention is extremely flexible in adjustment and is thus readily conformable to the preferences of a variety of different individual users. To fully appreciate the large degree of flexibility of adjustment, it should be noted that the desk 10 provides five independent and distinct adjustment axes or mechanisms. First, the support column 20 adjusts vertically along the pedestal 18 by means of the set screw 26. Second, the support column 20 is rotatably adjustable about the central vertical axis of the pedestal 18, also by manipulation of the set screw 26. Third, the mounting standard 38 is adjustable in a vertical direction in a telescopic manner within the support column 20 by manipulation of the set screw 34. Fourth, the mounting socket 50 is adjustable telescopically along the length of the inclined upper leg 46 of the mounting standard 38 by manipulation of the set screw 58. Fifth, the angular orientation of the platform 64 and the attached desk surface 86 is pivotally adjustable about the axis of the shank 74 of the toggle clamping screw.

In addition to use as a desk, the support device 10 of the present invention may be utilized with or without the desk surface 86 to support and secure various items such as two-way radios, beverage containers, etc. In this context, it should be noted that the mounting platform 64 may be interchangeably utilized with a variety of specially configured support surfaces as an alternative to the desk surface 86.

The portable desk 10 illustrated in FIGS. 1 and 4 may also be utilized as a portable podium For example, the set screw 26 may be utilized to secure the support column 20 to a microphone stand or other similar support base. The remaining components of the device 10 may then be readily adjusted to provide a custom individual fit to meet the needs of a speaker during an oral presentation.

The various components of the desk 10 are preferably formed from a durable material with an attractive surface finish. For example, the support column 20, mounting standard 38, and mounting socket 50 may be formed from a tubular metal material with an enameled or chrome plated finish. The base plate 12, pedestal 18, support platform 64 and bracket 65 are also preferably formed from a metal material. While the various components of the device of the desk 10 may be formed in a variety of different dimensions, as will be readily appreciated by those of ordinary skill in the art, example preferred lengths, with reference to FIG. 5, are a length L I of the support column 20 of approximately 10 inches, a length L2 of the vertical lower leg portion 40 of the mounting standard 38 of about 8.25 inches, a length L3 of the upper inclined leg portion 46 of the mounting standard 38 of about 7 inches, and a length L4 of the mounting socket 50 of about 5 inches.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A support device, comprising:

a base;

a support column; means mounting said support column for rotational and vertical adjustment relative to said base;

a mounting standard including a straight lower leg connected to an obliquely inclined upper leg;

means mounting said lower leg of said mounting standard for adjustment relative to said support column;

a support platform; and means adjustably securing said support platform to said obliquely inclined upper leg of said mounting standard for linear adjustment along said obliquely inclined upper leg and for pivotal adjustment about an axis substantially transverse to said obliquely inclined upper leg.

2. The support device of claim 1, further comprising means mounting said support platform for independent adjustment on five axes relative to said base.

3. The support device of claim 1, wherein said support column and said mounting standard comprise telescopically interfitting members having non-cylindrical transverse cross-sectional shapes.

4. The support device of claim 1, wherein said means mounting said support column for rotational and vertical adjustment relative to said base comprises an upstanding pedestal secured to said base and disposed in telescopically interfitting relationship with said support column.

5. The support device of claim 1, wherein said means adjustably securing said support member to said mounting standard comprises a mounting socket having first and second opposite ends;

means adjustably securing said first end of said mounting socket to said mounting standard; and means adjustably securing said second end of said mounting socket to said support member.

6. The support device of claim 5, wherein said means adjustably securing said first end of said mounting socket comprises said mounting socket and said mounting standard disposed in telescopically interfitting relationship.

7. The support device of claim 6, said means adjustably securing said second end of said mounting socket comprises a bracket on said support member and a pivot member pivotally securing said bracket to said second end of said mounting socket.

8. The support device of claim 7, wherein said pivot member comprises a toggle clamping screw.

9. A portable desk especially adapted for use in a vehicle, comprising:

a base plate for securement to a floorboard of a vehicle;

a cylindrical pedestal centrally upstanding from said base plate;

a tubular vertical support column having a square transverse cross-sectional shape, a lower end of said support column receiving said pedestal therein;

a first set screw securing said support column in a vertically and rotatably adjusted position to said pedestal;

a tubular mounting standard having a square transverse cross-sectional shape, said mounting standard including a straight lower leg connected to an inclined upper leg by an intermediate forty-five degree bend portion;

a second set screw securing said lower leg of said mounting standard in a telescopically adjusted position within an upper end of said support column;

a tubular mounting socket having a square transverse cross-sectional shape;

a third set screw securing said upper leg of said mounting standard in a telescopically adjusted position within a lower end of said mounting socket;

a support platform;

a channel-shaped bracket secured to a bottom surface of said support platform, said bracket including spaced leg portions provided with coaxial apertures;

an upper end of said mounting socket disposed between said bracket legs, said mounting socket including a transverse bore disposed in coaxial alignment with said bracket apertures;

a toggle clamp screw extending through said bracket legs and said upper end of said mounting socket and securing said support platform for pivotal adjustment relative to said upper end of said mounting socket; and a desk surface attached to said support platform.

10. A portable desk especially adapted for use in a vehicle, comprising:

a base plate for securement to a floorboard of a vehicle;

a cylindrical pedestal centrally upstanding from said base plate;

a tubular vertical support column having a non-circular transverse cross-sectional shape, a lower end of said support column receiving said pedestal therein and mounting said support column for rotational adjustment about a vertical axis and for axial adjustment along said vertical axis;

a first fastener for selectively adjustably securing said support column in vertically and rotatably adjusted position to said pedestal;

a tubular mounting standard having a non-circular transverse cross-sectional shape, said mounting standard including a straight lower leg connected to an inclined upper leg by an intermediate oblique bend portion;

a second fastener securing said lower leg of said mounting standard in a telescopically adjusted position within an upper end of said support column;

a tubular mounting socket having a non-circular transverse cross-sectional shape;

a third fastener securing said upper leg of said mounting standard in a telescopically adjusted position within a lower end of said mounting socket;

a support platform;

a channel-shaped bracket secured to a bottom surface of said support platform, said bracket including spaced leg portions provided with coaxial apertures;

an upper end of said mounting socket disposed between said bracket legs, said mounting socket including a transverse bore disposed in coaxial alignment with said bracket apertures;

a toggle clamp screw extending through said bracket legs and said upper end of said mounting socket and securing said support platform for pivotal adjustment relative to said upper end of said mounting socket; and a desk surface attached to said support platform, whereby said desk surface is mounted for independent adjustment on five axes relative to said base.

\* \* \* \* \*